Sept. 12, 1933.  G. H. BUCHANAN  1,926,510
SOLVENT
Filed Jan. 20, 1927
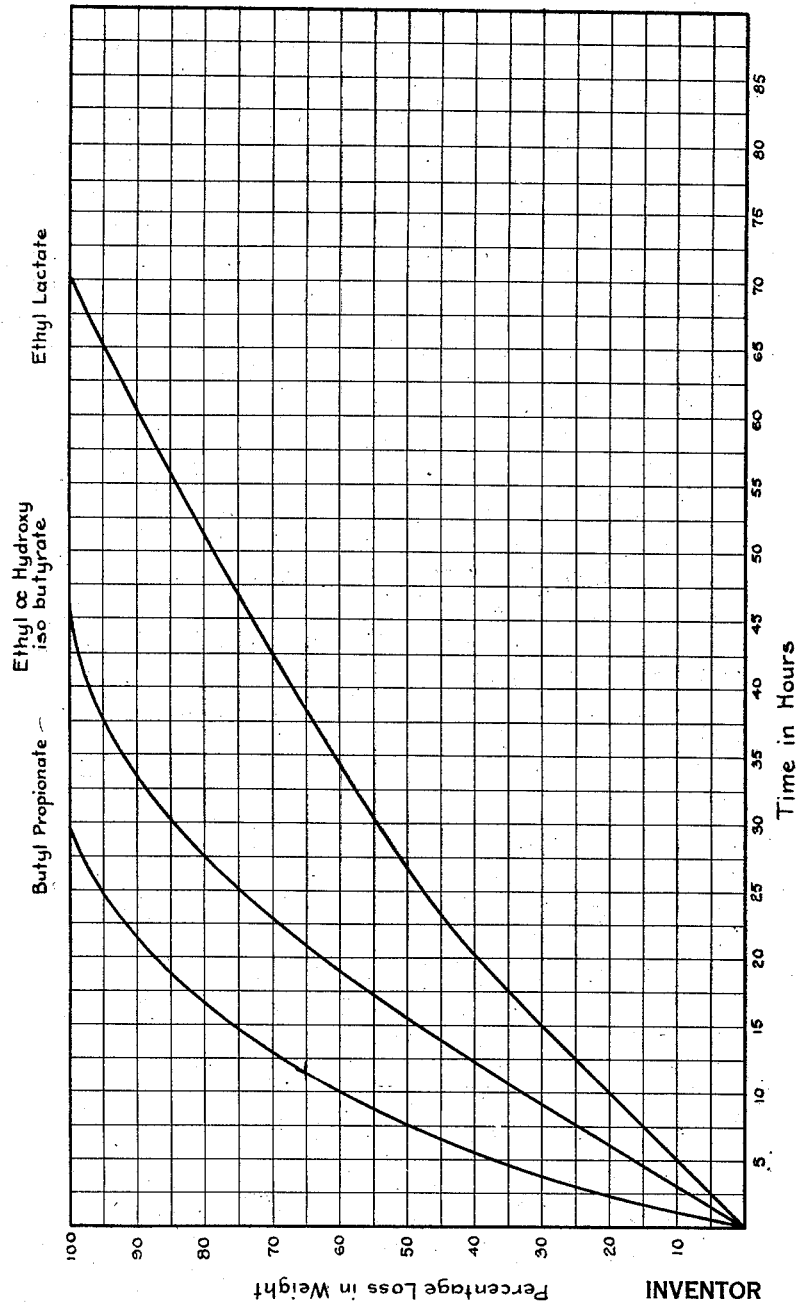
INVENTOR
GUY H. BUCHANAN.
BY
ATTORNEY Patented Sept. 12, 1933

1,926,510

UNITED STATES PATENT OFFICE 1,926,510

SOLVENT

Guy H. Buchanan, Westfield, N. J., assignor to American Cyanamid Company, New York, N. Y., a corporation of Maine Application January 20, 1927. Serial No. 162,306

13 Claims. (Cl. 134—79)

This invention relates to solvents, more particularly to a solvent for esters of cellulose and the like, such as cellulose nitrate.

Recently there have come into extensive use lacquers and varnishes having esters of cellulose as a base. Such lacquers have considerable advantage over the older oleo-resinous varnishes because they dry more rapidly and because the final protecting film is more resistant. The drying of a cellulose lacquer depends upon the evaporation of the solvents and the rate of drying is varied in practice by selection of the solvents and by variation in their proportions. For convenience solvents may be divided into three groups, the low boilers, the medium boilers and the high boilers. The last named group includes those solvents whose boiling points lie between 135° and 160° C.

Of the high boiling solvents in use at the present time butyl propionate and ethyl lactate are among the more important. Butyl propionate when pure boils at 145° C. but the article of commerce, which is produced from residues obtained in acetic acid manufacture, is a mixture of the butyl esters of several acids, propionic, butyric, valeric, etc., and has a boiling range frequently as wide as 125° to 160° C. Another disadvantage of butyl propionate is the fact that it does not stand dilution to any large degree with cheap non-solvents, such as toluol. This is shown by the figures given in Table II following.

Ethyl lactate is an excellent solvent and has a high dilution ratio to toluol. The boiling point of pure ethyl lactate is 155° C., and the boiling range of the commercial material is comparatively narrow. Although the boiling point of pure ethyl lactate is only 10° higher than that of butyl propionate, its vapor pressure at atmospheric temperature is very much lower than that of butyl propionate. This is shown by the vapor pressure curves given below and was confirmed by a simple experiment in which the time required for complete evaporation of solvent from a filter paper previously immersed in the liquid was noted. Twenty minutes were required for complete evaporation of the butyl propionate and forty minutes for the ethyl lactate. Slow evaporation is frequently desired by the lacquer manufacturer and in such cases ethyl lactate is an ideal solvent. If, however, a more rapid hardening of the lacquer film is required, a solvent having a higher rate of evaporation is preferred. A more rapid rate of evaporation may be secured by substituting methyl alcohol for ethyl alcohol, producing the methyl ester instead of the ethyl ester, but this, at the present price of methyl alcohol, adds very considerably to the cost of the solvent.

I have found that the esters of hydroxy isobutyric and similar acids are excellent solvents for nitrocellulose. These esters may be produced from acetone cyanhydrin and other cyanhydrins by treatment with hydrochloric acid and the desired alcohol. Although the boiling point of the ethyl ester of hydroxy isobutyric acid is given in the chemical literature as 150° C. little is said of its physical properties. So far as I am aware no one has ever suggested the use of these esters as solvents and there is no information to be found in the chemical literature concerning their solvent properties toward cellulose esters, their stability, or their dilution ratios toward non-solvents which would suggest their use in this field.

I prepared acetone cyanhydrin by addition of liquid hydrocyanic acid to substantially anhydrous acetone, using a little alcoholic caustic soda solution as catalyst. To the cyanhydrin so produced I added alcoholic hydrochloric acid and the amount of water required by the chemical equation and heated the mixture until the cyanhydrin was completely reacted. I then filtered off the precipitated ammonium chloride, washed it with alcohol, combining the filtrate and the washings, and separated the ester from the excess alcohol by fractional distillation.

The product so obtained was ethyl alpha hydroxy isobutyrate, having a boiling point of about 147° C.

The reactions taking place in the above process are probably in accordance with the following formulas:

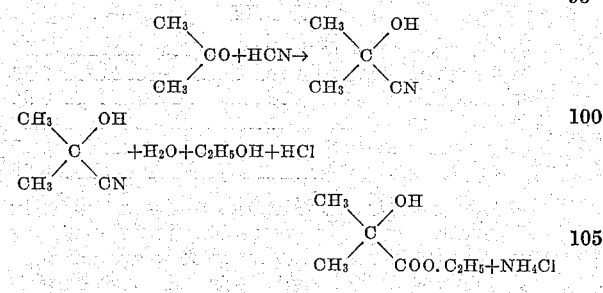

The following generic structural formulas indicate the general reactions which take place and the class of chemical compounds formed which I have found suitable for use as solvents for cellulose esters:

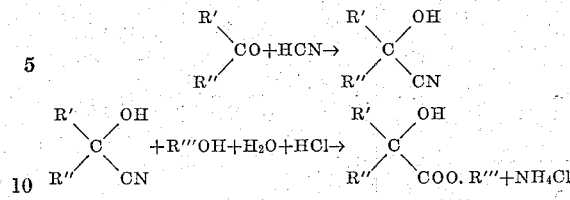

in which R', R" and R'" represent the same or different aliphatic radicals, and, more particularly where they represent methyl or ethyl radicals.

The viscosity of solutions of nitrocellulose in the solvent is a measure of the relative solvent powers of the solvent, the solvent producing the least viscous solution being the best solvent. In my tests I dissolved 18.3 grams of dry "four second" nitrocellulose in 50 cc. of the solvent and diluted with 100 cc. of toluene. Viscosities were determined by the falling ball viscosimeter. The results of my tests were as follows:

Table I

| | |
|---|---|
| Ethyl hydroxy isobutyrate | 16.6 seconds |
| Ethyl acetate | 12.7 seconds |
| Butyl acetate | 60 seconds |
| Ethyl lactate | 9.2 seconds |
| Butyl propionate | Too thick for test |

It is evident from the above figures that ethyl hydroxy isobutyrate is an excellent solvent for nitrocellulose.

The dilution ratio of a solvent is expressed as the number of cubic centimeters of non-solvent diluent (usually toluol) which may be added to one cubic centimeter of a solution of nitrocellulose in the solvent under test, before precipitation of the dissolved nitrocellulose occurs. In these tests 2 grams of ½ second nitrocellulose were dissolved in 20 cubic centimeters of solvent and toluol was added until a permanent turbidity was produced. The following ratios with toluol were obtained.

Table II

| | |
|---|---|
| Ethyl hydroxy isobutyrate | 6.0 |
| Ethyl lactate | 6.7 |
| Butyl propionate | 2.5 |
| Butyl acetate | 2.5 |

The esters of hydroxy iso-butyric acid are also excellent solvents for other cellulose esters such as cellulose acetate. The following is a table of dilution ratios determined as above with the nitrocellulose, dissolving two grams of cellulose acetate in 20 cubic centimeters of the solvent, and benzol being added to the clear solutions until a permanent turbidity was produced:

Table III

| | |
|---|---|
| Methyl hydroxy isobutyrate | 1.30 |
| Ethyl hydroxy isobutyrate | 0.90 |
| Acetone | 0.90 |
| Ethyl acetate | 0.25 |
| Ethyl methyl ketone | 0.20 |
| Di-acetone alcohol | 0.95 |

I have also found that the esters of hydroxy isobutyric acid are very stable under ordinary conditions of storage and that they are particularly stable against hydrolysis. In one experiment I added 5% of water to the ester and heated it in a constant temperature bath at 60° C. for eight days. I found that only 0.06% of the ester was hydrolyzed under these severe conditions, evidencing a stability toward hydrolysis far in excess of the requirements of practice.

The rate of evaporation of ethyl hydroxy isobutyrate at atmospheric temperatures was determined by exposing weighed portions of the solvent to the air. For comparison, the rate of evaporation of butyl propionate and of ethyl lactate was determined at the same time and under the same conditions. In the accompanying drawing constituting a part hereof, the single figure shows a series of curves representing the relative rates of evaporation at room temperature of ethyl propionate, ethyl alpha hydroxy isobutyrate and ethyl lactate. The curves indicate that the rate of evaporation of ethyl alpha hydroxy isobutyrate is intermediate between those of the other two solvents.

I may employ alcohols other than ethyl alcohol in the production of the esters of hydroxy isobutyric acid and can in this way alter the rate of evaporation of the solvent. Thus by substitution of methyl alcohol for ethyl alcohol I lower the atmospheric boiling point by about twelve degrees, methyl hydroxy isobutyrate having a boiling point of about 135° C. Substitution of butyl or amyl alcohol for ethyl alcohol raises the boiling point. The esters of all of these alcohols are excellent solvents, change in the alcohol having comparatively little effect upon the solvent properties, the only important effect being upon the rate of evaporation of the esters.

It is also obvious that one may substitute for acetone, which is dimethyl ketone, other ketones such as diethyl ketone or methyl ethyl ketone or others without departing from the spirit of the invention. Also, although, I have discussed the solvent properties of the ester for cellulose nitrate, I consider my new solvents suitable for use with other esters of cellulose, for example with cellulose acetate. These and other changes may be made in my invention, the scope of which is defined in the claims appended hereto.

What I claim is:

1. A composition of matter comprising cellulose nitrate and an ester of alpha hydroxy isobutyric acid the ester being a solvent for the cellulose nitrate.

2. A composition of matter comprising cellulose nitrate and the ethyl ester of alpha hydroxy isobutyric acid.

3. A composition of matter comprising a cellulose ester and an ester of alpha hydroxy isobutyric acid the latter ester being compatible with the cellulose ester.

4. A composition of matter comprising a cellulose ester and the ethyl ester of alpha hydroxy iso-butyric acid.

5. A composition of matter comprising a cellulose ester and a compound having the following generic formula:

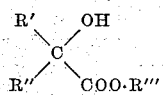

in which R' and R" represent methyl or ethyl, and R'" represents an aliphatic radical, the compound represented by the formula being a solvent of the cellulose ester.

6. The composition of claim 5, in which R', R" and R'" represent methyl or ethyl.

7. The composition of claim 5, in which R' and R" represent ethyl the compound represented by the formula being a solvent for the cellulose ester.

8. The composition of claim 5, in which R' represents methyl and R" represents ethyl the compound represented by the formula being a solvent for the cellulose ester.

9. The composition of claim 5, in which the cellulose ester is nitrocellulose and in which R' and R" represent methyl or ethyl the compound represented by the formula being a liquid solvent for the nitrocellulose.

10. The composition of claim 5, in which the cellulose ester is nitrocellulose and in which R', R" and R''' represent methyl or ethyl.

11. The composition of claim 5, in which the cellulose ester is nitrocellulose and in which R' and R" represent ethyl the compound represented by the formula being a liquid solvent for the nitrocellulose.

12. The composition of claim 5, in which the cellulose ester is nitrocellulose and in which R' represents methyl and R" represents ethyl the compound represented by the formula being a liquid solvent for the nitrocellulose.

13. A composition as defined in claim 5 in which R' and R" represent ethyl or methyl groups and R''' represents an aliphatic group containing from one to five carbon atoms.

GUY H. BUCHANAN.